(12) United States Patent
Mozel et al.

(10) Patent No.: US 11,629,265 B2
(45) Date of Patent: Apr. 18, 2023

(54) LOW-FRICTION IMAGES BY INKJET PRINTING

(71) Applicants: Kornit Digital Ltd., Rosh HaAyin (IL); Allon Shimoni

(72) Inventors: Jacob Mozel, Kfar-Saba (IL); Muhammad Iraqi, Tira (IL)

(73) Assignee: Kornit Digital Ltd., Rosh HaAyat (IL)

( * ) Notice: Subject to any disclaimer, the term of this patent is extended or adjusted under 35 U.S.C. 154(b) by 491 days.

(21) Appl. No.: 16/758,063

(22) PCT Filed: Oct. 22, 2018

(86) PCT No.: PCT/IL2018/051128
§ 371 (c)(1),
(2) Date: Apr. 22, 2020

(87) PCT Pub. No.: WO2019/077615
PCT Pub. Date: Apr. 25, 2019

(65) Prior Publication Data
US 2021/0130635 A1    May 6, 2021

Related U.S. Application Data

(60) Provisional application No. 62/575,456, filed on Oct. 22, 2017.

(51) Int. Cl.
| | |
|---|---|
| *C09D 11/54* | (2014.01) |
| *B41M 5/00* | (2006.01) |
| *B41M 7/00* | (2006.01) |
| *C09D 11/037* | (2014.01) |
| *C09D 11/06* | (2006.01) |
| *C09D 11/102* | (2014.01) |
| *C09D 11/322* | (2014.01) |
| *C09D 11/38* | (2014.01) |
| *C09D 11/40* | (2014.01) |
| *D06P 1/52* | (2006.01) |
| *D06P 1/655* | (2006.01) |
| *D06P 5/00* | (2006.01) |
| *D06P 5/30* | (2006.01) |

(52) U.S. Cl.
CPC .......... *C09D 11/54* (2013.01); *B41M 5/0047* (2013.01); *B41M 7/0018* (2013.01); *C09D 11/037* (2013.01); *C09D 11/06* (2013.01); *C09D 11/102* (2013.01); *C09D 11/322* (2013.01); *C09D 11/38* (2013.01); *C09D 11/40* (2013.01); *D06P 1/5292* (2013.01); *D06P 1/655* (2013.01); *D06P 5/002* (2013.01); *D06P 5/30* (2013.01)

(58) Field of Classification Search
CPC ......... C09D 11/40; C09D 11/54; C09D 11/06; C09D 11/322; C09D 11/102; C09D 11/037; D06P 5/30; D06P 5/002; D06P 1/5292; D06P 1/5257; D06P 1/655; D06P 1/6533; B41M 7/0018; B41M 5/0047; B41M 5/0017; B41M 5/0064
See application file for complete search history.

(56) References Cited

U.S. PATENT DOCUMENTS

| | | |
|---|---|---|
| 2,123,638 A | 7/1938 | Steccone |
| 3,100,704 A | 8/1963 | Coles et al. |
| 3,968,498 A | 7/1976 | Uchiyama |
| 3,990,363 A | 11/1976 | Vertegaal |
| 4,021,591 A | 5/1977 | De Vries et al. |
| 4,284,758 A | 8/1981 | North |
| 4,285,690 A | 8/1981 | North |
| 4,296,421 A | 10/1981 | Hara et al. |
| 4,312,007 A | 1/1982 | Winfield |
| 4,345,063 A | 8/1982 | North |
| 4,380,770 A | 4/1983 | Maruyama |
| 4,435,442 A | 3/1984 | Hefele |
| 4,630,076 A | 12/1986 | Yoshimura |
| 4,702,742 A | 10/1987 | Iwata et al. |
| 4,888,093 A | 12/1989 | Dean et al. |
| 5,348,997 A | 9/1994 | Kato et al. |
| 5,349,021 A | 9/1994 | Rooney et al. |
| 5,360,933 A | 11/1994 | Imashiro et al. |
| 5,428,383 A | 6/1995 | Shields et al. |
| 5,432,229 A | 7/1995 | Aoki et al. |

(Continued)

FOREIGN PATENT DOCUMENTS

| | | |
|---|---|---|
| CN | 1612919 | 5/2005 |
| CN | 1676547 | 10/2005 |

(Continued)

OTHER PUBLICATIONS

International Search Report and the Written Opinion dated Oct. 26, 2021 From the International Searching Authority Re. Application No. PCT/IL2021/050893 (12 Pages).
Advisory Action dated Oct. 19, 2021 From the US Patent and Trademark Office Re. U.S. Appl. No. 16/744,833. (4 Pages).
Final Official Action dated Jan. 15, 2021 from the US Patent and Trademark Office Re. U.S. Appl. No. 16/744,833. (52 pages).
Interview Summary Dated Jan. 14, 2021 from the US Patent and Trademark Office Re. U.S. Appl. No. 16/774,073. (2 pages).
Communication of the Board of Appeal Pursuant to Article 15(1) of the Rules of Procedure of the Boards of Appeal Dated Mar. 24, 2021 From the Boards of Appeal of The European Patent Office Re. Application No. 05745218.7. (12 Pages).

(Continued)

*Primary Examiner* — An H Do

(57) ABSTRACT

Provided are compositions and processes formulated and practiced to reduce the friction-coefficient of the printed area and also of the non-printed areas around the image, wherein the compositions are formulated for use by wet-on-wet techniques in-line of the pre-curing printing process, without pretreating the fabric for softness and smoothness prior to the printing process. The compositions comprise at least 15% by weight of a friction-coefficient reduction agent and having a pH lower than 6.5 so as to effect upon contact immobilization of an ink composition that is being digitally applied on the substrate.

23 Claims, No Drawings

(56) References Cited

U.S. PATENT DOCUMENTS

| | | |
|---|---|---|
| 5,501,902 A | 3/1996 | Kronzer |
| 5,510,415 A | 4/1996 | Zahrobsky et al. |
| 5,518,534 A | 5/1996 | Pearlstine et al. |
| 5,534,904 A | 7/1996 | Sheinman |
| 5,582,104 A | 12/1996 | Best et al. |
| 5,594,044 A | 1/1997 | Yang |
| 5,596,047 A | 1/1997 | Wu et al. |
| 5,631,684 A | 5/1997 | Takaide et al. |
| 5,645,888 A | 7/1997 | Titterington et al. |
| 5,757,407 A | 5/1998 | Rezanka |
| 5,798,179 A | 8/1998 | Kronzer |
| 5,820,661 A | 10/1998 | Gregory et al. |
| 5,835,116 A | 11/1998 | Sato et al. |
| 5,858,514 A | 1/1999 | Bowers |
| 5,866,638 A | 2/1999 | Shimomura |
| 5,885,335 A | 3/1999 | Adams et al. |
| 5,902,387 A | 5/1999 | Suzuki et al. |
| 5,970,874 A | 10/1999 | Bill |
| 5,981,113 A | 11/1999 | Christian |
| 5,988,791 A | 11/1999 | Miyashita et al. |
| 6,042,228 A | 3/2000 | Yamada et al. |
| 6,059,391 A | 5/2000 | Fulkerson et al. |
| 6,063,922 A | 5/2000 | Flood et al. |
| 6,071,368 A | 6/2000 | Boyd et al. |
| 6,087,061 A | 7/2000 | Hare et al. |
| 6,095,628 A | 8/2000 | Rhome |
| 6,117,921 A | 9/2000 | Ma et al. |
| 6,124,398 A | 9/2000 | Imashiro et al. |
| 6,126,281 A | 10/2000 | Shimoda et al. |
| 6,132,502 A | 10/2000 | Yatake |
| 6,140,391 A | 10/2000 | Zou et al. |
| 6,156,072 A | 12/2000 | Usui et al. |
| 6,161,929 A | 12/2000 | Erdtmann et al. |
| 6,183,079 B1 | 2/2001 | Meade et al. |
| 6,196,674 B1 | 3/2001 | Takemoto |
| 6,200,667 B1 | 3/2001 | Haruta et al. |
| 6,206,516 B1 | 3/2001 | Moriyama et al. |
| 6,262,796 B1 | 7/2001 | Loopstra et al. |
| 6,267,518 B1 | 7/2001 | Abe |
| 6,270,189 B1 | 8/2001 | Miyashita et al. |
| 6,277,183 B1 | 8/2001 | Johnson et al. |
| 6,281,269 B1 | 8/2001 | Schut |
| 6,291,023 B1 | 9/2001 | Nigam |
| 6,300,391 B2 | 10/2001 | Parazek et al. |
| 6,322,620 B1 | 11/2001 | Xiao |
| 6,326,419 B1 | 12/2001 | Smith |
| 6,335,140 B1 | 1/2002 | Miyazaki |
| 6,341,856 B1 | 1/2002 | Thompson et al. |
| 6,500,880 B1 | 3/2002 | Parazek |
| 6,416,923 B2 | 7/2002 | Miyazaki |
| 6,450,633 B1 | 9/2002 | Kronzer |
| 6,464,649 B1 | 10/2002 | Duchon et al. |
| 6,472,051 B2 | 10/2002 | Hirabavashi et al. |
| 6,513,924 B1 | 2/2003 | Goldberg et al. |
| 6,517,199 B1 | 2/2003 | Tomioka et al. |
| 6,536,894 B1 | 3/2003 | Rasmussen |
| 6,606,427 B1 | 8/2003 | Graves et al. |
| 6,626,530 B2 | 9/2003 | Snow et al. |
| 6,647,208 B1 | 11/2003 | Kirby |
| 6,682,189 B2 | 1/2004 | May et al. |
| 6,698,874 B2 | 3/2004 | Katsuki |
| 6,755,518 B2 | 6/2004 | Codos |
| 6,785,436 B2 | 8/2004 | Ravikanth et al. |
| 6,840,992 B2 | 1/2005 | Glaum et al. |
| 6,879,378 B2 | 4/2005 | Morita et al. |
| 7,119,160 B2 | 10/2006 | Kodama et al. |
| 7,134,749 B2 | 11/2006 | Ben Zur et al. |
| 7,275,806 B2 | 10/2007 | Matsuzawa et al. |
| 7,338,988 B2 | 3/2008 | Hesler et al. |
| 7,381,347 B2 | 6/2008 | Jacobs, III et al. |
| 7,425,062 B2 | 9/2008 | Bauer |
| 7,607,745 B2 | 10/2009 | Ben-Zur |
| 7,723,400 B2 | 5/2010 | Kobayashi et al. |
| 7,748,838 B2 | 7/2010 | Oishi |
| 8,540,358 B2 | 9/2013 | Mozel et al. |
| 8,569,397 B2 | 10/2013 | Ohzeki |
| 8,926,080 B2 | 1/2015 | Mozel et al. |
| 9,340,694 B2 | 5/2016 | Oura et al. |
| 9,611,401 B2 | 4/2017 | Mozel et al. |
| 9,616,683 B2 | 4/2017 | Mozel et al. |
| 9,783,700 B2 * | 10/2017 | Tamai ................ C09D 11/322 |
| 10,472,533 B2 | 11/2019 | Mozel et al. |
| 2002/0009662 A1 | 1/2002 | Miyazaki |
| 2002/0022120 A1 | 2/2002 | Katsuki et al. |
| 2002/0044188 A1 | 4/2002 | Codos |
| 2002/0060728 A1 | 5/2002 | Koizumi et al. |
| 2003/0064206 A1 | 4/2003 | Koyano et al. |
| 2003/0069329 A1 | 4/2003 | Kubota et al. |
| 2003/0117473 A1 | 6/2003 | Smith |
| 2003/0142167 A1 | 7/2003 | Nakamura et al. |
| 2003/0157304 A1 | 8/2003 | Li et al. |
| 2003/0172840 A1 | 9/2003 | Blank et al. |
| 2003/0197750 A1 | 10/2003 | Iwatsuki et al. |
| 2003/0197772 A1 | 10/2003 | Iwatsuki et al. |
| 2003/0205159 A1 | 11/2003 | McNeil |
| 2004/0024083 A1 | 2/2004 | Lee |
| 2004/0100542 A1 | 5/2004 | Chen et al. |
| 2004/0179077 A1 | 9/2004 | Samii et al. |
| 2004/0252173 A1 | 12/2004 | Ben-Zur et al. |
| 2005/0012798 A1 | 1/2005 | Adachi |
| 2005/0046684 A1 | 3/2005 | Yoneyama |
| 2005/0098054 A1 | 5/2005 | Berndtsson et al. |
| 2005/0174411 A1 | 8/2005 | Adachi et al. |
| 2005/0179706 A1 | 8/2005 | Childers |
| 2005/0179708 A1 | 8/2005 | Ben-Zur |
| 2005/0185004 A1 | 8/2005 | Couwenhoven et al. |
| 2005/0203245 A1 | 9/2005 | Lee et al. |
| 2005/0233097 A1 | 10/2005 | Tojo et al. |
| 2006/0249039 A1 | 11/2006 | Feldman et al. |
| 2006/0284929 A1 | 12/2006 | Matsuzawa et al. |
| 2007/0103528 A1 | 5/2007 | Pearl et al. |
| 2007/0103529 A1 | 5/2007 | Pearl et al. |
| 2007/0104899 A1 | 5/2007 | Pearl et al. |
| 2007/0148128 A1 | 6/2007 | Kennedy et al. |
| 2007/0218222 A1 | 9/2007 | Campbell et al. |
| 2007/0229577 A1 | 10/2007 | Morimoto |
| 2008/0006176 A1 | 1/2008 | Houjou |
| 2008/0012884 A1 | 1/2008 | Ben-Zur et al. |
| 2008/0095940 A1 | 4/2008 | Lee et al. |
| 2008/0108746 A1 | 5/2008 | Waki et al. |
| 2008/0241397 A1 | 10/2008 | Kato et al. |
| 2008/0241436 A1 | 10/2008 | Kobayashi |
| 2008/0268156 A1 | 10/2008 | Ueno et al. |
| 2009/0122127 A1 | 5/2009 | Baker |
| 2010/0073408 A1 | 3/2010 | Hale et al. |
| 2010/0075045 A1 | 3/2010 | Kaimoto et al. |
| 2010/0166962 A1 | 7/2010 | Ohzeki |
| 2011/0032304 A1 | 2/2011 | Mozel et al. |
| 2011/0079716 A1 | 4/2011 | Ganapathiappan et al. |
| 2011/0169901 A1 | 7/2011 | Pinto et al. |
| 2011/0290127 A1 | 12/2011 | Biel et al. |
| 2012/0081477 A1 | 4/2012 | Nagano |
| 2012/0128949 A1 | 5/2012 | Goto |
| 2012/0139984 A1 | 6/2012 | Lang |
| 2012/0251795 A1 | 10/2012 | Okada et al. |
| 2013/0155162 A1 | 6/2013 | Ohtsuka |
| 2013/0169984 A1 | 7/2013 | Oya et al. |
| 2014/0036014 A1 | 2/2014 | Mozel et al. |
| 2014/0192112 A1 | 7/2014 | Nagashima et al. |
| 2015/0077488 A1 | 3/2015 | Mozel et al. |
| 2015/0152274 A1 | 6/2015 | Pearl et al. |
| 2015/0284905 A1 | 10/2015 | Mozel |
| 2016/0176201 A1 | 1/2016 | Kitagawa et al. |
| 2016/0057314 A1 | 2/2016 | Morovic et al. |
| 2016/0060810 A1 | 3/2016 | Saito et al. |
| 2017/0145239 A1 | 5/2017 | Mozel et al. |
| 2019/0281191 A1 | 9/2019 | Morovic et al. |
| 2019/0382608 A1 | 12/2019 | Mozel et al. |
| 2020/0140708 A1 | 5/2020 | Shimoni et al. |
| 2020/0157367 A1 | 5/2020 | Ben-Zur |
| 2020/0157371 A1 | 5/2020 | Mozel et al. |
| 2020/0282741 A1 | 9/2020 | Amir et al. |

(56) References Cited

U.S. PATENT DOCUMENTS

2021/0284859 A1　9/2021　Mozel et al.
2021/0380829 A1　12/2021　Shimoni et al.

FOREIGN PATENT DOCUMENTS

| | | |
|---|---|---|
| CN | 1890111 | 1/2007 |
| DE | 3121043 | 3/1982 |
| EP | 0121083 | 10/1984 |
| EP | 0277361 | 8/1988 |
| EP | 709519 | 3/1996 |
| EP | 1247890 | 10/2002 |
| EP | 1281533 | 2/2003 |
| EP | 1652895 | 5/2006 |
| EP | 1853431 | 11/2007 |
| EP | 2166046 | 3/2010 |
| EP | 2405055 | 1/2012 |
| EP | 3184692 | 6/2017 |
| GB | 422488 | 1/1935 |
| IL | 162231 | 5/2007 |
| JP | 59-187029 | 10/1984 |
| JP | 61-075870 | 4/1986 |
| JP | 63-031593 | 6/1988 |
| JP | 05-293954 | 11/1993 |
| JP | 0790780 | 4/1995 |
| JP | 08-232176 | 9/1996 |
| JP | 61-231285 | 10/1996 |
| JP | 09-039365 | 2/1997 |
| JP | 10-278379 | 10/1998 |
| JP | 10-330661 | 12/1998 |
| JP | 11-138768 | 5/1999 |
| JP | 2000-103995 | 4/2000 |
| JP | 2001-130162 | 5/2001 |
| JP | 2002-036644 | 2/2002 |
| JP | 2002-332437 | 11/2002 |
| JP | 2003-160455 | 3/2003 |
| JP | 2003-312069 | 11/2003 |
| JP | 2004-532750 | 10/2004 |
| JP | 2005-320663 | 11/2005 |
| JP | 2006-124843 | 5/2006 |
| JP | 2006-124854 | 5/2006 |
| JP | 2006-199498 | 8/2006 |
| JP | 2006-256163 | 9/2006 |
| JP | 2008-018664 | 1/2008 |
| JP | 2009-061645 | 3/2009 |
| JP | 2009-285877 | 12/2009 |
| JP | 2010-053357 | 3/2010 |
| JP | 2010-241068 | 10/2010 |
| JP | 2011-063016 | 3/2011 |
| JP | 2011-127001 | 6/2011 |
| JP | 2012-008254 | 1/2012 |
| JP | 2013-209788 | 10/2013 |
| JP | 2013-227414 | 11/2013 |
| JP | 2014-001378 | 1/2014 |
| JP | 2014-131855 | 7/2014 |
| JP | 2014-173017 | 9/2014 |
| JP | 2016-050277 | 4/2016 |
| JP | 2017-114934 | 6/2017 |
| JP | 2017-171907 | 9/2017 |
| WO | WO 98/30749 | 7/1998 |
| WO | WO 99/56948 | 11/1999 |
| WO | WO 00/73570 | 12/2000 |
| WO | WO 01/17792 | 3/2001 |
| WO | WO 01/32974 | 5/2001 |
| WO | WO 01/49504 | 7/2001 |
| WO | WO 02/066565 | 8/2002 |
| WO | WO 02/078958 | 10/2002 |
| WO | WO 03/057787 | 7/2003 |
| WO | WO 2005/076730 | 8/2005 |
| WO | WO 2005/106109 | 11/2005 |
| WO | WO 2005/115089 | 12/2005 |
| WO | WO 2005/115761 | 12/2005 |
| WO | WO 2011/018786 | 2/2011 |
| WO | WO 2011/055639 | 5/2011 |
| WO | WO 2011/078068 | 6/2011 |
| WO | WO 2013/046884 | 4/2013 |
| WO | WO 2015/152291 | 10/2015 |
| WO | WO 2016/027835 | 2/2016 |
| WO | WO 2017/109786 | 6/2017 |
| WO | WO 2018/07834 | 5/2018 |
| WO | WO 2019/077603 | 4/2019 |
| WO | WO 2019/077615 | 4/2019 |
| WO | WO 2020/027842 | 2/2020 |
| WO | WO 2022/024109 | 2/2022 |

OTHER PUBLICATIONS

Summons to Attend Oral Proceedings Pursuant to Rule 115(1) EPC Dated Nov. 27, 2020 From the European Patent Office Re. Application No. 05745218.7. (7 Pages).
Notice of Reason(s) for Rejection dated Oct. 22, 2021 From the Japan Patent Office Re. Application No. 2019-523628 and Its Translation Into English. (9 Pages).
Notification of Office Action and Search Report dated Jan. 17, 2022 From the State Intellectual Property Office of the People's Republic of China Re. Application No. 2017-80069685.7. (12 Pages).
Notification of Office Action and Search Report dated Mar. 16, 2022 From the State Intellectual Property Office of the People's Republic of China Re. Application No. 201880078383.0. (6 Pages).
Advisory Action dated Dec. 30, 2021 from US Patent and Trademark Office Re. U.S. Appl. No. 14/619,218. (10 pages).
Examination Report Under Sections 12 & 13 of the Patents Act, 1970 and the Patents Rules, 2003 dated Dec. 17, 2021 From the Government of India, Intellectual Property India, Patents. Designs, Trade Marks, Geographical Indications, The Patent Office Re. Application No. 201927020694. (5 Pages).
Official Action dated Sep. 24, 2020 from the US Patent and Trademark Office Re. U.S. Appl. No. 14/619,218. (20 pages).
Official Action dated Jul. 8, 2021 from the US Patent and Trademark Office Re. U.S. Appl. No. 16/756,519. (68 pages).
Supplementary European Search Report and the European Search Opinion dated Sep. 14, 2021 From the European Patent Office Re. Application No. 18868124.1. (9 Pages).
English Summary dated May 30, 2022 of Notification of Office Action and Search Report dated May 11, 2022 From the State Intellectual Property Office of the People's Republic of China Re. Application No. 201780069685.7. (2 Pages).
Notification of Office Action and Search Report dated May 11, 2022 From the State Intellectual Property Office of the People's Republic of China Re. Application No. 201780069685.7. (6 Pages).
Official Action dated Dec. 4, 2020 From the US Patent and Trademark Office Re. U.S. Appl. No. 16/774,073. (99 Pages).
Translation Dated Aug. 25, 2021 of Examination Report dated Jul. 7, 2021 From the Service Publico Federal, Ministerio da Economia, Instituto National da Propriedade Industrial do Brasil RE Application No. BR112013014918.3. (4 Pages).
Communication Pursuant to Article 94(3) EPC dated Jul. 26, 2021 From the European Patent Office Re. Application No. 05745218.7. (4 Pages).
Supplementary European Search Report and the European Search Opinion dated Jul. 12, 2021 From the European Patent Office Re. Application No. 18867552.4. (15 Pages).
English Translation Dated Feb. 18, 2022 of Notification of Office Action and Search Report dated Jan. 17, 2022 From the State Intellectual Property Office of the People's Republic of China Re. Application No. 2017-80069685.7. (5 Pages).
Decision of Rejection dated May 17, 2022 From the Japan Patent Office Re. Application No. 2019-523628. (1 Page).
Notification of Office Action and Search Report dated Jun. 3, 2021 From the State Intellectual Property Office of the People's Republic of China Re. Application No. 201780069685.7 and Its Translation of Office Action Into English. (11 Pages).
Interview Summary dated May 13, 2021 From the US Patent and Trademark Office Re. U.S. Appl. No. 16/744,833. (2 Pages).
Notice of Allowance dated Aug. 1, 2022 from US Patent and Trademark Office Re. U.S. Appl. No. 16/744,833. (15 pages).
Final Official Action dated Mar. 25, 2021 from the US Patent and Trademark Office Re. U.S. Appl. No. 16/744,833. (12 pages).

(56) References Cited

OTHER PUBLICATIONS

Granted Decision dated Apr. 30, 2021 from the US Patent and Trademark Office Re. U.S. Appl. No. 16/744,833. (2 pages).
Interview Summary dated Oct. 27, 2020 from the US Patent and Trademark Office Re. U.S. Appl. No. 16/341,069. (3 pages).
Final Official Action dated Feb. 8, 2021 From the US Patent and Trademark Office Re. U.S. Appl. No. 16/341,069. (18 Pages).
Supplementary European Search Report and the European Search Opinion dated Jun. 24, 2020 From the European Patent Office Re. Application No. 17865042.0. (13 Pages).
Examination Report dated Jul. 7, 2021 From the Servico Publico Federal, Ministerio da Economia, Institute Nacional da Propriedade Industrial do Brasil RE Application No. BR1120190088628. (4 Pages).
Final Official Action dated Aug. 11, 2021 from the US Patent and Trademark Office Re. U.S. Appl. No. 14/619,218. (16 pages).
Final Official Action dated Jul. 23, 2021 from the US Patent and Trademark Office Re. U.S. Appl. No. 16/744,833. (26 pages).
Official Action dated Aug. 7, 2020 from the US Patent and Trademark Office Re. U.S. Appl. No. 16/341,069. (58 pages).
Official Action dated Mar. 11, 2022 from US Patent and Trademark Office Re. U.S. Appl. No. 16/744,833. (8 pages).
Official Action dated Mar. 19, 2021 From the US Patent and Trademark Office Re. U.S. Appl. No. 14/619,218. (24 Pages).
Acknowledgment of Request for Notice of Allowance dated Jun. 18, 2013 From the US Patent and Trademark Office Re. U.S. Appl. No. 12/853,389.
Advisory Action Before the Filing of an Appeal Brief dated Apr. 18, 2019 From the US Patent and Trademark Office Re. U.S. Appl. No. 14/619,218. (4 pages).
Advisory Action Before the Filing of an Appeal Brief dated Dec. 29, 2017 From the US Patent and Trademark Office Re. U.S. Appl. No. 14/619,218. (6 pages).
Advisory Action dated May 21, 2020 from the US Patent and Trademark Office Re. U.S. Appl. No. 14/619,218. (4 pages).
Advisory Action dated May 27, 2014 From the US Patent and Trademark Office Re. U.S. Appl. No. 13/206,646.
Applicant-Initiated Interview Summary dated Aug. 8, 2018 From the US Patent and Trademark Office Re. U.S. Appl. No. 14/619,218. (3 pages).
Applicant-Initiated Interview Summary dated Oct. 9, 2013 From the US Patent and Trademark Office Re. U.S. Appl. No. 12/853,361.
Applicant-Initiated Interview Summary dated Feb. 13, 2014 From the US Patent and Trademark Office Re. U.S. Appl. No. 11/606,242.
Brief Communication dated Oct. 16, 2018 From the European Patent Office Re. Application No. 05745218.7. (4 Pages).
Communication Pursuant to Article 94(3) EPC dated Oct. 10, 2014 From the European Patent Office Re. Application No. 10754998.2.
Communication Pursuant to Article 94(3) EPC dated Nov. 12, 2009 From the European Patent Office Re. Application No. 05703208.8.
Communication Pursuant to Article 94(3) EPC dated Feb. 14, 2018 From the European Patent Office Re. Application No. 10754998.2. (5 Pages).
Communication Pursuant to Article 94(3) EPC dated Oct. 17, 2017 From the European Patent Office Re. Application No. 10754998.2. (3 Pages).
Communication Pursuant to Article 94(3) EPC dated Jan. 20, 2017 From the European Patent Office Re. Application No. 05745218.7. (5 Pages).
Communication Pursuant to Article 94(3) EPC dated Aug. 21, 2017 From the European Patent Office Re. Application No. 05745218.7. (3 Pages).
Communication Pursuant to Article 94(3) EPC dated Mar. 29, 2017 From the European Patent Office Re. Application No. 10754998.2. (3 Pages).
Communication Pursuant to Rule 114(2) EPC dated Nov. 22, 2017 From the European Patent Office Re. Application No. 05745218.7. (3 Pages).
Decision to Refuse a European Patent Application dated Nov. 5, 2018 From the European Patent Office Re. Application No. 05745218.7. (12 Pages).
Examination Report Under Sections 12 & 13 of the Patents Act, 1970 and the Patents Rules, 2003 dated Dec. 13, 2017 From the Government of India, Intellectual Property India, Patents, Designs, Trade Marks, Geographical Indications Re. Application No. 185/MUMNP/2012. (6 Pages).
Final Official Action dated Apr. 15, 2020 from the US Patent and Trademark Office Re. U.S. Appl. No. 14/619,218. (16 pages).
Hearing Notice Dated Dec. 7, 2018 From the Government of India, Patent Office, Intellectual Property Office Building Re. Application No. 185/MUMNP/2012. (3 Pages).
International Preliminary Report on Patentability dated May 7, 2020 From the International Bureau of WIPO Re. Application No. PCT/IL2018/051128. (8 Pages).
International Preliminary Report on Patentability dated May 9, 2019 From the International Bureau of WIPO Re. Application No. PCT/IL2017/051181. (7 Pages).
International Preliminary Report on Patentability dated Dec. 14, 2006 From the International Bureau of WIPO Re. Application No. PCT/il/2005/000558.
International Preliminary Report on Patentability dated Jul. 17, 2007 From the International Preliminary Examining Authoirty Re. Application No. PCT/IL05/00166.
International Preliminary Report on Patentability dated Feb. 23, 2012 From the International Bureau of WIPO Re. Application No. PCT/IL2010/000645.
International Preliminary Report on Patentability dated Nov. 26, 2007 From the International Preliminary Examining Authority Re. Application No. PCT/IL05/00559.
International Preliminary Report on Patentability dated Apr. 30, 2020 From the International Bureau of WIPO Re. Application No. PCT/IL2018/051107. (6 Pages).
International Preliminary Report on Patentabillity dated Feb. 8, 2007 From the International Preliminary Examining Authority Re.: Application No. PCT/IL05/00166.
International Preliminary Report on Patentabillity dated Nov. 29, 2011 From the International Preliminary Examining Authority Re.: Application No. PCT/IL05/00166.
International Search Report and the Written Opinion dated Jan. 8, 2019 From the International Searching Authority Re. Application No. PCT/IL2018/051107. (9 Pages).
International Search Report and the Written Opinion dated Jan. 18, 2018 From the International Searching Authority Re. Application No. PCT/IL2017/051181. (16 Pages).
International Search Report and the Written Opinion dated Dec. 21, 2010 From the International Searching Authority Re. Application No. PCT/IL2010/000645.
International Search Report and the Written Opinion dated Dec. 25, 2018 From the International Searching Authority Re. Application No. PCT/IL2018/051128. (14 Pages).
International Search Report dated Jan. 4, 2006 From the International Searching Authority Re. Application No. PCT/IL05/00559.
International Search Report dated Jan. 9, 2007 From the International Searching Authority Re. Application No. PCT/IL05/00166.
International Search Report dated Sep. 19, 2006 From the International Searching Authority Re. Application No. PCT/IL0500558.
Notification of Office Action and Search Report dated Sep. 16, 2015 From the State Intellectual Property Office of the People's Republic of China Re. Application No. 201410254004.2 and Its Translation Into English.
Notification of Office Action and Search Report dated Oct. 24, 2016 From the State Intellectual Property Office of the People's Republic of China Re. Application No. 201410254004.2 and Its Summary in English. (6 Pages).
Notification of Office Action and Search Report dated Feb. 25, 2015 From the State Intellectual Property Office of the People's Republic of China Re. Application No. 201410254004.2 and Its Translation Into English.
Notification of Office Action dated Feb. 26, 2016 From the State Intellectual Property Office of the People's Republic of China Re. Application No. 201410254004.2.

(56) References Cited

OTHER PUBLICATIONS

Office Action dated Jul. 3, 2006 From the Israeli Patent Office Re. Application No. 162231 and Its Translation Into English.
Office Action dated Dec. 7, 2010 From the Israel Patent Office Re. Application No. 179765 and Its Translation Into English.
Office Action dated Aug. 18, 2010 From the Israeli Patent Office Re. Application No. 163459 and Its Translation Into English.
Office Action dated Feb. 21, 2006 From the Israeli Patent Office Re. Application No. 162231 and Its Translation Into English.
Office Action dated Mar. 24, 2011 From the Israeli Patent Office Re. Application No. 177323 and Its Translation Into English.
Office Action dated Aug. 26, 2009 From the Israeli Patent Office Re. Application No. 177323 and Its Translation Into English.
Office Action dated Jul. 28, 2010 From the Israeli Patent Office Re. Application No. 177323 and Its Translation Into English.
Official Action dated Jul. 1, 2016 From the US Patent and Trademark Office Re. U.S. Appl. No. 14/619,218.
Official Action dated Feb. 2, 2017 From the US Patent and Trademark Office Re. U.S. Appl. No. 111606,242. (11 pages).
Official Action dated Dec. 4, 2015 From the US Patent and Trademark Office Re. U.S. Appl. No. 14/619,218.
Official Action dated Jun. 5, 2020 from the US Patent and Trademark Office Re. U.S. Appl. No. 16/744,833. (44 Pages).
Official Action dated Dec. 6, 2010 From the US Patent and Trademark Office Re. U.S. Appl. No. 10/589,234.
Official Action dated May 7, 2009 From the US Patent and Trademark Office Re. U.S. Appl. No. 11/588,277.
Official Action dated Sep. 7, 2010 From the US Patent and Trademark Office Re. U.S. Appl. No. 10/589,234.
Official Action dated Apr. 8, 2016 From the US Patent and Trademark Office Re. U.S. Appl. No. 11/606,242.
Official Action dated Feb. 8, 2011 From the US Patent and Trademark Office Re. U.S. Appl. No. 11/606,242.
Official Action dated Oct. 8, 2015 From the US Patent and Trademark Office Re. U.S. Appl. No. 14/554,287.
Official Action dated Apr. 9, 2018 From the US Patent and Trademark Office Re. U.S. Appl. No. 111606,242. (16 pages).
Official Action dated Apr. 9, 2019 From the US Patent and Trademark Office Re. U.S. Appl. No. 15/424,943. (16 Pages).
Official Action dated Sep. 9, 2016 From the US Patent and Trademark Office Re. U.S. Appl. No. 11/606,242.
Official Action dated Mar. 10, 2006 From the US Patent and Trademark Office Re. U.S. Appl. No. 10/461,414.
Official Action dated Aug. 11, 2017 From the US Patent and Trademark Office Re. U.S. Appl. No. 111606,242. (16 pages).
Official Action dated Jun. 11, 2014 From the US Patent and Trademark Office Re. U.S. Appl. No. 12/853,361.
Official Action dated May 11, 2007 From the US Patent and Trademark Office Re. U.S. Appl. No. 10/776,163.
Official Action dated Feb. 12, 2008 From the US Patent and Trademark Office Re. U.S. Appl. No. 10/776,163.
Official Action dated Jul. 12, 2013 From the US Patent and Trademark Office Re. U.S. Appl. No. 11/606,242.
Official Action dated Mar. 12, 2012 From the US Patent and Trademark Office Re. U.S. Appl. No. 12/853,369.
Official Action dated Jul. 14, 2016 From the US Patent and Trademark Office Re. U.S. Appl. No. 13/975,399.
Official Action dated May 14, 2009 From the US Patent and Trademark Office Re. U.S. Appl. No. 11/606,242.
Official Action dated May 14, 2012 From the US Patent and Trademark Office Re. U.S. Appl. No. 12/853,361.
Official Action dated Jan. 15, 2013 From the US Patent and Trademark Office Re. U.S. Appl. No. 12/853,361.
Official Action dated Jul. 15, 2016 From the US Patent and Trademark Office Re. U.S. Appl. No. 14/554,287.
Official Action dated Nov. 15, 2013 From the US Patent and Trademark Office Re. U.S. Appl. No. 12/853,361.
Official Action dated Jul. 17, 2008 From the US Patent and Trademark Office Re. U.S. Appl. No. 11/606,154.
Official Action dated Jul. 17, 2008 From US Patent and Trademark Office Re. U.S. Appl. No. 11/606,154.
Official Action dated May 17, 2018 From the US Patent and Trademark Office Re. U.S. Appl. No. 14/619,218. (21 pages).
Official Action dated Jul. 18, 2014 From the US Patent and Trademark Office Re. U.S. Appl. No. 11/606,242.
Official Action dated Jun. 18, 2013 From the US Patent and Trademark Office Re. U.S. Appl. No. 12/853,361.
Official Action dated Mar. 18, 2015 From the US Patent and Trademark Office Re. U.S. Appl. No. 11/606,242.
Official Action dated Feb. 19, 2014 From the US Patent and Trademark Office Re. U.S. Appl. No. 13/206,646.
Official Action dated Nov. 19, 2007 From the US Patent and Trademark Office Re. U.S. Appl. No. 10/776,163.
Official Action dated Oct. 19, 2010 From US Patent and Trademark Office Re. U.S. Appl. No. 90/009,646.
Official Action dated Aug. 20, 2008 From the US Patent and Trademark Office Re. U.S. Appl. No. 10/776,163.
Official Action dated Dec. 20, 2012 From the US Patent and Trademark Office Re. U.S. Appl. No. 12/853,389.
Official Action dated Aug. 21, 2012 From the US Patent and Trademark Office Re. U.S. Appl. No. 12/853,361.
Official Action dated Apr. 22, 2010 From the US Patent and Trademark Office Re. U.S. Appl. No. 90/009,646.
Official Action dated Nov. 22, 2016 From the US Patent and Trademark Office Re. U.S. Appl. No. 13/975,399. (15 pages).
Official Action dated Aug. 23, 2011 From the US Patent and Trademark Office Re. U.S. Appl. No. 11/606,242.
Official Action dated Feb. 23, 2017 From the US Patent and Trademark Office Re. U.S. Appl. No. 14/619,218. (16 pages).
Official Action dated May 23, 2012 From the US Patent and Trademark Office Re. U.S. Appl. No. 11/606,242.
Official Action dated Jan. 25, 2007 From the US Patenbtand Trademark Office Re. U.S. Appl. No. 10/776,163.
Official Action dated Feb. 26, 2009 From the United States Patent and Tademark Office Re. U.S. Appl. No. 10/776,163.
Official Action dated Jan. 26, 2010 From the US Patent and Trademark Office Re. U.S. Appl. No. 90/009,646.
Official Action dated Jul. 27, 2009 From the US Patent and Trademark Office Re. U.S. Appl. No. 11/606,242.
Official Action dated Nov. 27, 2019 From the US Patent and Trademark Office Re. U.S. Appl. No. 16/558,356. (22 pages).
Official Action dated Jul. 29, 2013 From the US Patent and Trademark Office Re. U.S. Appl. No. 13/206,646.
Official Action dated May 29, 2020 from the US Patent and Trademark Office Re. U.S. Appl. No. 16/774,073. (16 pages).
Official Action dated Aug. 30, 2017 From the US Patent and Trademark Office Re. U.S. Appl. No. 14/619,218. (19 pages).
Official Action dated Jan. 30, 2019 From the US Patent and Trademark Office Re. U.S. Appl. No. 14/619,218. (24 pages).
Official Action dated Jun. 30, 2006 From the US Patent and Trademark Office Re. U.S. Appl. No. 10/776,163.
Official Action dated Nov. 30, 2012 From the US Patent and Trademark Office Re. U.S. Appl. No. 11/606,242.
Official Action dated Nov. 30, 2018 From the US Patent and Trademark Office Re. U.S. Appl. No. 15/424,943. (56 pages).
Official Action dated Sep. 30, 2019 From the US Patent and Trademark Office Re. U.S. Appl. No. 14/619,218. (17 Pages).
Official Action dated Mar. 31, 2009 From the US Patent and Trademark Office Re. U.S. Appl. No. 11/606,154.
Official Action dated Mar. 31, 2010 From the US Patent and Trademark Office Re. U.S. Appl. No. 11/606,242.
Proceeding Further With the European Patent Application Pursuant to Rule 70(2) EPC Dated Apr. 29, 2015 From the European Patent Office Re. Application No. 05745218.7.
Provision of the Minutes in Accordance With Rule 124(4) EPC Dated Nov. 5, 2018 From the European Patent Office Re. Application No. 05745218.7. (22 Pages).
Restriction Official Action dated Apr. 3, 2012 From the US Patent and Trademark Office Re. U.S. Appl. No. 12/853,361.
Restriction Official Action dated Aug. 6, 2012 From the US Patent and Trademark Office Re. U.S. Appl. No. 12/853,389.

(56) References Cited

OTHER PUBLICATIONS

Restriction Official Action dated Sep. 13, 2018 From the US Patent and Trademark Office Re. U.S. Appl. No. 15/424,943. (8 pages).
Restriction Official Action dated May 14, 2013 From the US Patent and Trademark Office Re. U.S. Appl. No. 13/206,646.
Restriction Official Action dated Oct. 24, 2019 From the US Patent and Trademark Office Re. U.S. Appl. No. 16/558,356. (8 pages).
Restriction Official Action dated Jan. 29, 2016 From the US Patent and Trademark Office Re. U.S. Appl. No. 13/975,399.
Summons to Attend Oral Proceedings Pursuant to Rule 115(1) EPC Dated Jan. 30, 2018 From the European Patent Office Re. Application No. 05745218.7. (7 Pages).
Supplementary European Search Report dated Apr. 9, 2015 From the European Patent Office Re. Application No. 05745218.7.
Supplementary European Search Report dated Aug. 26, 2009 From the European Patent Office Re. Application No. 05703208.8.
Supplementary European Search Report dated Jun. 29, 2009 From the European Patent Office Re. Application No. 05744201.4.
Third Party Request for Ex Parte Reexamination Dated Nov. 30, 2009 From the US Patent and Trademark Office Re. U.S. Pat. No. 7,134,749.
Translation Dated Mar. 9, 2016 of Notification of Office Action dated Feb. 26, 2016 From the State Intellectual Property Office of the People's Republic of China Re. Application No. 201410254004.2.
Translation of Notice of Reason for Rejection dated Jun. 17, 2011 From the Japanese Patent Office Re. Application No. 2007-514324.
Translation of Notice of Reason for Rejection dated Nov. 18, 2011 From the Japanese Patent Office Re. Application No. 2007-514324.
Translation of Notice of Reason for Rejection dated Sep. 28, 2010 From the Japanese Patent Office Re. Application No. 2006-552776.
Translation of Notification of Office Action dated Jul. 29, 2013 From the State Intellectual Property Office of the People's Republic of China Re. Application No. 201080045541.6.
Translation of Search Report dated Jul. 29, 2013 From the State Intellectual Property Office of the People's Republic of China Re. Application No. 201080045541.6.
Written Opinion dated Jan. 4, 2006 From the International Searching Authority Re. Application No. PCT/IL05/00559.
Written Opinion dated Jan. 9, 2007 From the International Searching Authority Re. Application No. PCT/IL05/00166.
Written Opinion dated Sep. 19, 2006 From the International Searching Authority Re. Application No. PCT/IL0500558.
BASF Corporation "HPD User's Guide, Stronger Inks for a More Colorful World", 2013.
Kessel et al. "The Diacetone Acrylamide Crosslinking Reaction and Its Influence on the Film Formation of an Acrylic Latex", Journal of Coatings Technology and Research, 5(3): 285-297, Sep. 2008.
Riesen et al. "The Glass Transition Temperature Measured by Different TA Techniques. Part 2: Determination of Glass Transition Temperatures", Mettler Toledo, UserCom, XP007918757, p. 1-20, Feb. 2003.
Wikipedia "Boehmite", Wikipedia, the Free Encyclopedia, Retrieved From the Internet, Dec. 11, 2007.
Notice of Reason(s) for Rejection dated Mar. 12, 2021 From the Japan Patent Office Re. Application No. 2019-523628 and Its Translation Into English. (13 Pages).
Notification of Office Action and Search Report dated Aug. 10, 2021 From the State Intellectual Property Office of the People's Republic of China Re. Application No. 1220200219335 and Its Translation of Office Action Into English. (8 Pages).
Interview Summary dated Dec. 7, 2020 from the US Patent and Trademark Office Re. U.S. Appl. No. 14/619,218. (3 pages).
Geckeler et al. "Carbon Nanotubes: Are They Dispersed or Dissolved in Liquids?" Nanosclae Research Letters 6:136, 3 pages, 2011.
Notice of Reasons for Rejection dated Sep. 30, 2022 From the Japan Patent Office Re. Application No. 2020-522341. (5 Pages).
Official Action dated Nov. 9, 2022 from the US Patent and Trademark Office Re. U.S. Appl. No. 17/333,035. (129 pages).

\* cited by examiner

LOW-FRICTION IMAGES BY INKJET PRINTING

RELATED APPLICATIONS

This application is a National Phase of PCT Patent Application No. PCT/IL2018/051128 having International filing date of Oct. 22, 2018, which claims the benefit of priority under 35 USC § 119(e) of U.S. Provisional Patent Application No. 62/575,456 filed on Oct. 22, 2017. The contents of the above applications are all incorporated by reference as if fully set forth herein in their entirety.

FIELD AND BACKGROUND OF THE INVENTION

The present invention, in some embodiments thereof, relates to digital inkjet printing technology for textile and, more particularly, but not exclusively, to processes, machines and compositions for direct digital inkjet printing of low-friction color images on fabrics.

Direct inkjet printing on fabrics typically involves forming a film on the surface of the substrate such that the colorant (e.g., pigment) particles are embedded in the film and the film is affixed to the substrate. Adherence of the film is typically achieved by forming bonds between functional groups in the substrate and corresponding functional groups in the material of the film; the film comprises binders and adhesion promoting agents, collectively referred to herein as film-forming agents. Once a "wet" film is printed on the substrate, it undergoes crosslinking which cures the film and forms the bonds with the substrate, whereas curing is typically effected by heat or other forms of energy.

Problems associated with inkjet printing liquid inks directly on absorptive substrates, such as textile and garments, have been mitigated in U.S. Patent Application Publication No. 20150152274, and PCT Application Nos. WO 2005/115089 and WO 2005/115761, by the present assignee. These documents teach a process, a composition and an apparatus for printing an image on an absorptive surface, such as an untreated (a substrate that has not been pre-treated chemically) textile piece, that includes applying a wetting composition on the surface which is capable of interfering with the engagement of a liquid ink composition with the binding sites of the surface. According to the processes taught in these patent applications, once the wetting composition is applied, the liquid ink composition is applied while the surface is still wet. Using this process, a vivid color image is formed on the absorptive surface. These patent applications, however, fail to address printing a color image on an absorptive dark surface.

Multi-part ink compositions, which are based on contacting an immobilizing composition and a colored ink composition on the surface of an untreated substrate, so as to congeal the colored ink composition on the substrate, thereby minimizing feathering and soaking thereof into absorptive substrates, are also taught in U.S. patent application Ser. No. 11/588,277 (U.S. Patent Application Publication No. 20070104899), and U.S. patent application Ser. No. 11/606,242 (U.S. Patent Application Publication No. 20070103529).

Problems associated with inkjet printing transparent liquid inks directly on dark substrates, such as dyed textile and garments, have been mitigated in U.S. Pat. No. 7,134,749, by the present assignee. This document teaches a method and an apparatus for color printing on an untreated dark textile piece which includes digitally printing, by means of an inkjet printer head, an opaque white ink layer directly onto the untreated dark textile piece, and digitally printing a colored image on the white ink layer.

U.S. Pat. No. 8,540,358, by the present assignee, teaches an inkjet ink compositions for forming an image in a form of an elastic film attached to a surface of an untreated stretchable and/or flexible substrate and processes utilizing same for inkjet printing color images on various substrates such as colored and absorptive or impregnable stretchable materials, which are characterized by heightened efficiency in process time, ink and energy consumption, as well as products having durable, wash-fast and abrasion-fast images printed thereon by the process, are disclosed.

U.S. Provisional Patent Application No. 62/450,146, by the present assignee, teaches an inkset and a process for direct inkjet printing color images on dyed synthetic fabrics, based on forming an image on the fabric in the form of a well-adhered crosslinked film, using an acid-immobilized ink composition, while avoiding dye migration from the fabric to the image in the process of curing the film, using a low-temperature curing crosslinking agent and curing the image at a temperature lower than 120±5° C.

Direct inkjet printing of pigments on untreated fabrics has enjoyed the improvements provided by the aforementioned technologies, since the emulsified and/or suspended pigment particles are required to be bound to the substrate by means of film-forming agents (adhesion agents and/or binders), forming a transparent film that encapsulates the pigment particles while adhering to the substrate, and in cases where the substrate is not white, the process is supplemented by an opaque white base layer. The aforementioned technologies employed the presence of emulsified film-forming adhesion agents and film-forming binders and/or dispersants of the suspended pigment particles, by utilizing property-sensitive variants of these ingredients, wherein these ingredients tend to lose their solubility in the ink's medium, and thereby cause coagulation of the ink composition when contacting with a property-adjusting agent (e.g., an acid) on the surface of the substrate. In addition, the aforementioned technologies are based on the ability to crosslink the various ingredients of the film amongst themselves and with the substrate, which is obtained by using a crosslinking agent which cures the film at elevated temperatures.

The requirement to form a well-adhered pigment-containing film on the substrate has led individuals and companies to the development of a variety of solutions to improve film adherence; however, while the majority of these solutions have succeeded in improving adherence of the film according to some testing standards, and the stretchability of the film as well, the resulting pigment-containing film remained or became rough to the touch and sometimes tacky, possibly due to the presence of pigment particle in the film, or due to the friction coefficient of the cured film.

Prints with relatively high friction coefficient tend to have a rough hand feel and lower wash-fastness. Thus, reducing the friction coefficient of textile in general, and of printed textile in particular, has been a requirement of the textile industry for several reasons, starting with the need for facile flow of the fabric during mechanized handling thereof (e.g., during manufacturing, dying, printing and cutting), and continuing with the seeking pleasant hand feel and higher wash-fastness of the finished textile product. Some manufacturers have attempted to provide fabrics with low friction coefficients by pre-treating the fabric's yarns or the finished fabric for softening and smoothing the fabric; however, these some of these approached do not provide a comprehensive solution to the problem of on-the-fly printing on untreated fabrics and/or the high friction coefficient of an image printed on the pre-treated fabric.

SUMMARY OF THE INVENTION

The present invention provides compositions and processes useful in the textile industry, and particularly in the field of design and fashion textile industry, effected by digital inkjet methods; the compositions and processes are formulated and practiced to lower the friction-coefficient of the printed area and also of the non-printed areas around the image. The provisions of the present invention are drawn to efficient and cost-effective solutions for problems associated with current methodologies for softening and smoothing printed fabrics, by providing compositions that can be used by on-the-fly techniques wherein the reduction of the friction-coefficient of the printed area is effected in-line of the printing process while the ink is still wet (not cured), without pretreating the fabric for softness and smoothness prior to the printing process, or drying and post-treating the fabric for softness and smoothness.

According to an aspect of some embodiments of the present invention there is provided an inkjet ink immobilizing composition, which includes a property-adjusting agent, a friction-coefficient reduction agent (FCRA) and a carrier, wherein the property-adjusting agent is an acid that lowers a pH level at a surface of a substrate thereby effecting immobilization of an ink composition upon contacting the ink composition with the immobilizing composition on the surface, and wherein a the FCRA is stable in acidic conditions and soluble in the immobilizing composition at a concentration of at least 15% of the total weight of the composition.

According to some embodiments of the invention, the concentration of the FCRA in the immobilizing composition ranges from 15% to 35% of the total weight of the composition.

According to some embodiments of the invention, the concentration of the FCRA in the immobilizing composition is 25% of the total weight of the composition.

According to some embodiments of the invention, the FCRA is selected from the group consisting of a cationic polysiloxane resin dispersion/emulsion, a cationic amino-functional polysiloxane resin dispersion/emulsion, a cationic quaternary ammonium fatty acid condensation product dispersion/emulsion, and any combination thereof.

According to some embodiments of the invention, the dispersion/emulsion further includes a monounsaturated fatty acid, an oil, a wax, and any combination thereof.

According to some embodiments of the invention, the oil is a vegetable oil.

According to some embodiments of the invention, the wax is a vegetable wax.

According to some embodiments of the invention, the immobilizing composition presented herein is having a pH that ranges from 2 to 6.5.

According to some embodiments of the invention, the concentration of the acid in the immobilizing composition ranges from 0.5% to 10% of the total weight of the composition.

According to some embodiments of the invention, the acid is a small molecule acid and/or an acidic polymer.

According to some embodiments of the invention, the small molecule acid is selected from the group consisting of acetic acid, propionic acid, butanoic acid, glycolic acid, lactic acid and any combination thereof.

According to some embodiments of the invention, the acidic polymer is characterized by an average molecular weight that ranges from 4000 g/mol to 20000 g/mol.

According to some embodiments of the invention, the acidic polymer is selected from the group consisting of polyacrylic acid, acidic alkoxylated polymer, poly(2-acrylamido-2-methylpropanesulphonic acid), poly(acrylic acid-co-maleic acid), poly(butadiene-co-maleic acid), poly(ethylene-co-acrylic acid), polymaleic acid, poly(methacrylic acid), poly(4-styrenesulfonic acid-co-maleic acid), and any mixture thereof.

According to some embodiments of the invention, the immobilizing composition presented herein is substantially devoid of a colorant.

According to some embodiments of the invention, the carrier of the immobilizing composition presented herein is an aqueous carrier.

According to some embodiments of the invention, the immobilizing composition presented herein is formulated for use in a direct inkjet printing machine and/or printhead.

According to some embodiments of the invention, the immobilizing composition presented herein is formulated for spraying from a nozzle, and is therefore characterized by at least one of:

a maximal particle size of less than 15 microns;
a dynamic viscosity at shear that ranges from 2 to 4 (N·s)/m2;
a room temperature Brookfield viscosity less than 3 centipoises;
a surface tension that ranges from 24 to 26 N/m; and
an electrical resistance of 50 to 2000 ohm per centimeter.

According to some embodiments of the invention, the immobilizing composition presented herein is formulated for jetting from a printhead, and is therefore characterized by at least one of:

a maximal particle size of less than 1 micron;
a dynamic viscosity at shear that ranges from 8 to 20 (N·s)/m2;
a room temperature Brookfield viscosity less than 25 centipoises;
a surface tension that ranges from 24 to 32 N/m; and
an electrical resistance of 50 to 2000 ohm per centimeter.

According to an aspect of some embodiments of the present invention there is provided an image printed on a substrate, wherein the image is in the form of a film attached to the substrate, the film is formed by contacting the immobilizing composition presented herein with an ink composition on a surface of the substrate, and curing the film, thereby forming the image.

According to some embodiments of the invention, the ink composition includes a dispersed pigment, an acid-sensitive agent and a carrier, the acid-sensitive agent effects coagulation of the ink composition upon contacting the immobilizing composition.

According to some embodiments of the invention, the acid-sensitive agent is in a form of a dispersed agent and/or emulsified agent.

According to some embodiments of the invention, the acid-sensitive agent is selected from the group consisting of a resin binder, a dispersing agent, a heat curable self-crosslinking resin, an adhesion promoting agent and a film-forming agent.

According to some embodiments of the invention, the acid-sensitive agent is an emulsified or dispersed alkali-soluble polymer selected from the group consisting of a polyacrylate, a polyurethane, a polyether, a polyester, a polyvinyl chloride, a polyvinyl acetate, a polyvinyl butyral, an aminosilicon and any co-polymer, salt or combination thereof.

According to some embodiments of the invention, the ink composition further includes a heat-curable crosslinking agent.

According to some embodiments of the invention, the static friction coefficient of the film is lower than 0.5.

According to some embodiments of the invention, the dynamic friction coefficient of the film is lower than 0.44.

According to an aspect of some embodiments of the present invention there is provided a substrate having the image afforded by the composition and process presented herein, attached to a surface thereof.

According to some embodiments of the invention, the substrate is a textile piece selected from the group consisting of a garment, an upholstery fabric and bedclothes.

According to an aspect of some embodiments of the present invention there is provided an inkjet printing kit that includes the immobilizing composition presented herein and an ink composition as defined herein.

According to some embodiments of the invention, each of the immobilizing composition and the ink composition in the kit are packaged separately in a packaging material.

According to some embodiments of the invention, in the kit, the immobilizing composition is identified in print, in or on the packaging material, for use in immobilizing the ink composition upon contacting the ink composition and for lowering a friction-coefficient of the image and the surface.

According to an aspect of some embodiments of the present invention there is provided a process of printing an image on a substrate, which includes contacting at least a portion of the substrate with the immobilizing composition as presented herein, and applying an ink composition as defined herein on the portion of the substrate, thereby printing the image.

According to some embodiments of the invention, the immobilizing composition and the ink composition are each individually applied on the portion of the substrate by a separate applicator.

According to some embodiments of the invention, the immobilizing composition is applied by a nozzle or an inkjet printhead.

According to some embodiments of the invention, the ink composition is applied by an inkjet printhead.

According to some embodiments of the invention, the immobilizing composition is applied in-line with the ink composition.

According to some embodiments of the invention, the immobilizing composition and the ink composition are applied concertedly, simultaneously, synchronously, concurrently, concomitantly or sequentially.

According to some embodiments of the invention, the immobilizing composition is applied on the surface before the ink composition is applied on the substrate, and the ink composition is applied on the substrate while the substrate is still wet with the immobilizing composition.

According to some embodiments of the invention, the ink composition is applied on the surface before the immobilizing composition is applied on the substrate, and the immobilizing composition is applied on the substrate while the substrate is still wet with the ink composition.

According to some embodiments of the invention, the ink composition and the immobilizing composition are each applied on the substrate substantially simultaneously.

According to some embodiments of the invention, the process presented herein further includes curing the image subsequent to the applying the ink composition.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

DESCRIPTION OF SPECIFIC EMBODIMENTS
OF THE INVENTION

The present invention, in some embodiments thereof, relates to inkjet printing technology and, more particularly, but not exclusively, to processes, machines and compositions for direct inkjet printing of low-friction color images on fabrics.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

As mentioned hereinabove, printed fabrics, particularly those printed with particulate colorants, suffer from rough hand-feel and low fastness under various normal use conditions. Typically, these problems are solved by adding a softener to the yarn, the finished fabric, or to the garment after printing. As mentioned hereinabove, these approaches are costly, time-consuming and complicated.

It is noted that the use of lubricants is not equivalent to lowering the friction coefficient of a surface, which is a change in the mechanical properties of the substance, or at least its surface; incorporating certain materials in a substance to lower the friction-coefficient of its surface may render the use of lubrication redundant.

The present inventors have contemplated a comprehensive solution for softening and smoothing printed fabrics, which can be made part of a standard digital inkjet printing process, and can be employed to all types of color images on any type of fabric. The present inventors have envisioned that the use of certain materials dissolved, emulsified or dispersed in a liquid composition that is applied on the substrate during the printing process while the ink is still wet (un-cured), rather than applying a softener or a lubricant on the surface of a fabric before the printing process or on the image after the printing process, would be advantageous as it will alters the mechanical properties of the material not only at the surface but also in the bulk of the film that is formed by the printing process. Thus, the compositions and processes presented herein provide a long-lasting solution when wear occurs at the film surface, since a low friction-coefficient of the film is maintained for extended periods of time while a lubricant applied on an image's surface may lose it friction reduction property as soon as the lubricant is removed or depleted.

While reducing the present invention to practice, it was found that some presently known softeners used in the textile industry are incompatible with one or more critical properties of liquid inkjet compositions. While searching for an ink composition that can contain sufficient amount of a suitable agent that can reduce the friction coefficient of the printed area on a substrate, it was found that in order to achieve sufficient or acceptable results, the amount needed rendered the ink composition unstable. It was then found that a group of friction-coefficient reduction agents (FCRAs) that are stable in acidic conditions, can be used at sufficient amounts as part of the immobilizing composition that is used in the printing process to immobilize the colored ink composition from soaking, feathering and coalescing into or on the absorbent textile substrate. While reducing the present invention to practice, it was surprisingly found that when selected according to certain criteria, an immobilization composition can comprise a suitable FCRA in an unprecedented amount of up to 30 percent of the total weight of the composition can effect significant reduction of the friction coefficient of the fabric and the printed area, while maintaining is required chemical stability, effective ink immobilization, and necessary non-staining/non-coloring attribute.

Immobilizing Composition:

According to embodiments of the present invention, the immobilizing composition containing a friction-coefficient reduction agent (FCRA-containing immobilizing composition) is capable of causing a change in an ink composition that leads to the immobilization of the ink composition that includes a dispersed colorant, a property-sensitive agent (e.g., an alkali-soluble agent), a film-forming agent and a carrier, whereas the immobilization of the ink droplets is effected upon contacting the two compositions on the surface of the substrate while each is still liquid and uncured.

Briefly, the immobilization of the ink composition is generally effected on at least a portion of a surface of a substrate with the aim of limiting or arresting inter-ink mixing (when more than one color is used for printing), soaking, spreading and feathering of the ink composition in/on the surface of the substrate, collectively referred to herein as "bleeding", particularly when inkjet-printing the ink composition on an absorptive substrate, such as textile. Immobilizing the ink composition further assists in forming a film on the surface of the substrate, thereby providing a finished and cured printed image having improved color resolution and wash-fastness properties. According to some embodiments of the present invention, the substrate is a textile substrate, such as a woven or non-woven fabric, a cloth, a garment and/or a piece of clothing.

Quantitatively, "immobilization" in the context of embodiment of the present invention is defined as elevating the viscosity of the color-bearing ink composition by 10-folds, 50-folds, 100-folds, 500-folds 1000-folds or 2000-folds and more. For example, when a given color-bearing ink composition is characterized by having a viscosity of 10-13 cp, it is defined as immobilized when its viscosity is elevated to about 2000 cp or higher as a result of congelation. In some embodiments, the term "immobilization" is used to refer to a sharp increase in viscosity of a liquid, such that droplets of the liquid are less prone to flow, soaking, bleeding, spreading and feathering.

Hence the chemical and/or physical change, which affects the droplets of liquid ink composition, according to some embodiments of the present invention, is generally referred to herein as "immobilization". In the context of the chemical and mechanical change that occurs in the ink composition, according to some embodiments of the present invention, the term "immobilization", as used herein, is interchangeable with the terms "coagulation", "congelation", "flocculation", "precipitation", "thickening" or "gelation", and refer to the sharp decrease in fluidity of a formerly fluid liquid. Coagulation can be effected also by, or seen as sedimentation, precipitation, partial solidification and partial polymerization of soluble constituents in the composition. The term "sedimentation", as used herein, refers to the destabilization of suspended colloidal or emulsified substances, such as pigment particles. The term "flocculation", as used herein, refers to the bridging between particles by a polymer chain, causing them to form flocs or larger aggregates that might sediment or precipitate.

According to some embodiments of the present invention, the FCRA-containing immobilizing composition is formulated to carry and deliver an FCRA agent and render the surface of the substrate into an acidic environment; the FCRA-containing immobilizing composition does not contain a colorant and is thus substantially transparent and colorless, and intended not to leave a distinguishable mark on the substrate. Thus, according to some embodiments of the present invention, the FCRA-containing immobilizing composition is essentially devoid of a colorant.

Friction-Coefficient Reduction Agents Suitable for Digital Printing:

Thus, according to an aspect of embodiments of the present invention, there is provided an inkjet ink immobilizing composition for use in a digital inkjet printing process, which is designed and formulated to effect immobilization of a compatible inkjet colored ink composition upon contact therebetween on the surface of a substrate, and further designed and formulated to effect a reduction of the reduction of the friction-coefficient of the image (film) that is formed on the printed substrate as a result of the printing process. The immobilizing composition includes a property-adjusting agent, a suitable friction-coefficient reduction agent (FCRA) and a carrier, wherein the property-adjusting agent is an acid that lowers the pH level at a surface of a substrate, and the friction-coefficient reduction agent is stable under acidic conditions and soluble in the immobilizing composition.

In order to effect rapid ink immobilization, the immobilizing composition presented herein is having an acidic pH that ranges from 2 to 6.5. In some embodiments of the present invention, the pH of the immobilizing composition comprising an FCRA agent, is formulated to be lower than 6.5, lower than 6, lower than 5.5, lower than 5, or lower than 4.5. In some embodiments, the pH of the immobilizing composition presented herein ranges from 4-6.5, or from 4-6.

The present inventors have found that since in some digital printing processes the immobilizing composition is applied sparingly on the substrate, the concentration of the FCRA in the immobilizing composition should be considerably higher than the widely used concentration known in the art, which is typically lower than 5% or lower than 3%. However, the acidic pH of the immobilizing composition limits the use of FCRAs to those that are chemically stable at acidic pH level, while still capable of being incorporated into and dissolved in the acidic composition at a sufficient concentration that can accomplish the desired reduction of the friction-coefficient. This sufficient concentration, according to some embodiments of the present invention, is at least at least 15% by weight of the total weight of the composition. In some embodiment, the concentration of the FCRA in the immobilizing composition is at least 17%, 20%, 23%, 25%, 27%, 30%, 32% or at least 35%. In some embodiments, the concentration of the FCRA in the immobilizing composition ranges 15-35% of the total weight of the composition. In some embodiments, the concentration of the FCRA in the immobilizing composition is 25% of the total weight of the composition.

In order to be suitable for use in the context of embodiments of the present invention, the FCRA is selected to be chemically stable in the acidic immobilizing composition. The term "chemically stable", or simply "stable", refers to the FCRA being capable of maintaining its structure and/or friction-coefficient reduction function, and stay dissolved or suspended in the immobilizing composition. While selecting suitable FCRAs, the present inventors have found that an exemplary family of cationic FCRAs are stable and soluble/suspendable in acidic media. Exemplary cationic FCRAs that are suitable for use in the context of some embodiments of the present invention include cationic polysiloxane resin dispersions/emulsions, cationic amino-functional (amino-modified) polysiloxane resin dispersions/emulsions, cationic quaternary ammonium fatty acid condensation product dispersions/emulsions, and any combination thereof.

Commercially available FCRAs that are suitable for use in the context of some embodiments of the present invention include, without limitation, RUCOFIN® AVO NEW, which is a preparation of cationic polysiloxane compound, natural vegetable oils and vegetable waxes based on avocado oil products, and having a pH of 5.0-5.5; PERRUSTOL® CCF is cationic fatty acid condensation product having a pH of 5-6.5; RUCOFIN® GES NEW is a cationic polysiloxane compound having a pH of 5.0-5.5; RUCOFIN® GSP 200 NEW is a cationic compound of polysiloxanes having a pH of 5.0-5.5; PERRUSTOL® HNS NEW is a cationic preparation of fatty acid condensation product and polyethylene having a pH of 5-6; RUCOFIN GNH is a non-ionic, weakly cationic in acid medium, polysiloxane compound; RUCOFIN GAA is a cationic polysiloxane compound; RUCOFIN GWE is a non-ionic (slightly cationic in acid medium) polysiloxane compound; RUCOFIN GWM is a non-ionic (slightly cationic in acid medium) polysiloxane compound; RUCOFIN GWS is a non-ionic polysiloxane; RUCOFIN GWT is a non-ionic polysiloxane; RUCOFIN HHM is a cationic poly siloxane compound; RUCOFIN HSF is a cationic Organopolysiloxane; RUCOFIN HSV NEW is a cationic preparation of fatty acid condensations product, silicone and polyethylene; RUCOFIN LAN NEW is a non-ionic polysiloxane and wax mixture; RUCOFIN MAX; RUCOFIN MIN; RUCOFIN PSO; RUCOFIN RMW are non-ionic polysiloxane compounds; RUCOFIN SIQ and SQS NEW are cationic polysiloxane compounds; WACKER's silicone fluid emulsions; WACKER's Powersoft AE 66; WACKER's Powersoft FE 55; WACKER's finish CT 34E; WACKER's finish CT45E; WACKER's finish CT78E; WACKER's finish CT 95E; Wetsoft's CTA; Wetsoft's NE 230; Wetsoft's NE 580; ASUTEX's silicone micro emulsions; Asumin's EC 25 micro; Asumin's NA-T; Asumin's H micro; Asumin's MH micro 36; Asumin's W micro and the likes.

In some embodiments, the FCRA is supplemented with an additive, such as, without limitation, a monounsaturated fatty acid, an oil, a wax, and any combination thereof. In some embodiments, the oil or wax is a vegetable oil or wax.

Property-Adjusting Agent:

The ink immobilizing composition provided herein is designed and formulated to cause a compatible colored ink composition to become less fluid upon contact therebetween. This feat is accomplished by using a complementary property-sensitive agent in the colored ink composition that causes the entire composition, or at least the dispersed colorant therein to coagulate when coming in contact with the property-adjusting agent. In the case of an acid as property-adjusting agent, the property-sensitive agent can be any element and ingredient in the colored ink composition that is sensitive to low pH (acid-sensitive, or acid responsive), as these are exemplified hereinbelow.

In some embodiments of the present invention, the low pH of the immobilizing composition is afforded by including therein a property-adjusting agent, namely an acid, at a concentration that ranges from 0.5% to 10% of the total weight of the composition. In some embodiments, the concentration of the property-adjusting agent is about 0.5%, 1%, 2%, 3%, 4%, 5%, 6%, 7%, 8%, 9% or about 10% of the total weight of the immobilizing composition.

The acid can be a small molecule acid and/or an acidic polymer, depending on the preference of the user, industry regulations, intended use and the likes.

A small molecule acid, organic acid or polymeric acid, may cause an ink composition containing, for example, a pH-sensitive alkali-soluble agent, to coagulate/congeal, and some acids might be more preferable for use in some embodiments and printing conditions and tasks. Less favorable acids include acids that impart a noticeable odor, or may burn-out the substrate, or leave a stain in the substrate, or cause a dye in the ink composition or the substrate to migrate or otherwise be diminished. According to embodiments of the present invention, suitable acids include glycolic acid (volatile), acetic acid (volatile with some vinegar odor), lactic acid (dimerized at elevated temperatures), malic acid, ascorbic acid, maleic acid, benzoic acid, some polymeric acids (acidic polymers), and any combination of the foregoing.

In some embodiments, a small molecule acid may be a transitory acid, namely an acid that is volatile and can be evaporated, or an acid that is chemically altered during curing or post-printing processes. Exemplary small molecule acids include acetic acid, propionic acid, butanoic acid, glycolic acid, lactic acid and any combination thereof.

When using an acidic polymer, in some embodiments of the present invention the polymer characterized by an average molecular weight that ranges from 4000 g/mol to 20000 g/mol. Exemplary acidic polymers include, without limitation, polyacrylic acid, acidic alkoxylated polymer, poly(2-acrylamido-2-methylpropanesulphonic acid), poly(acrylic acid-co-maleic acid), poly(butadiene-co-maleic acid), poly(ethylene-co-acrylic acid), polymaleic acid, poly(methacrylic acid), poly(4-styrenesulfonic acid-co-maleic acid), and any mixture thereof.

In some embodiments of the present invention, the FCRA-containing immobilizing composition may include one or more acidic agents (acids) in a total amount that ranges from about 0.1% to about 20% of the total weight of the immobilizing composition, or 0.5-15%, 0.5-10%, 0.1-5%, or 0.5-4%, or 0.5-3%, or 1-5%, or 1-4%, or 1-3%, or 1-2% acidic agents (acids) of the total weight of the immobilizing composition. If one acid or more is utilized, each acid may be present in any ratio between 0 and 100% comprising the blend of acids as long as the total amount of the acids in the immobilizing composition is within the desired range.

According to some embodiments, the immobilizing composition may be buffered by a suitable salt or weak base, such as ammonia/ammonium base or another volatile amine, to ensure the desired pH range while not leaving undesired traces on the substrate. Buffering may be accomplished by a buffering agent, such as, but not limited to a weak amine such as tris(hydroxymethyl aminomethane), also referred to as Tris or THAM.

According to some embodiments, the immobilizing composition is essentially devoid of an ammonium based buffering agent. Surprisingly, it has been found that a buffering agent such as ammonium salt of an acid (e.g., ammonium lactate), destabilizes the FCRA and may cause gradual gelation of the composition, leading eventually to printhead clogging and jetting rate instability.

Carrier and Optional Additives:

According to some embodiments of the present invention, the immobilizing composition is aqueous, namely the first carrier comprises water. In some embodiments, the aqueous carrier further includes a water-miscible organic solvent. The ratio of water to the water-miscible organic solvent ranges from 100:1-1:1. An exemplary family of water-miscible organic solvents are glycol ethers, which include, without limitation, dipropylene glycol methyl ether, ethylene glycol monomethyl ether, ethylene glycol monoethyl ether, ethylene glycol monopropyl ether, ethylene glycol monoisopropyl ether, ethylene glycol monobutyl ether, ethylene glycol monophenyl ether, ethylene glycol monobenzyl ether, diethylene glycol monomethyl ether, diethylene glycol monoethyl ether and diethylene glycol mono-n-butyl ether.

According to some embodiments of the present invention, the aqueous carrier can be made to be fast penetrating (rapid drying) by including surfactants or penetrating agents such as glycol ethers and 1,2-alkanediols such as ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. 1,2-Alkanediols are preferably 1,2-C4-6 alkanediols, most preferably 1,2-hexanediol. Suitable surfactants include ethoxylated acetylene diols (e.g. Surfynols® series from Air Products), ethoxylated primary (e.g. Neodol® series from Shell) and secondary (e.g. Tergitol® series from Union Carbide) alcohols, sulfosuccinates (e.g. Aerosol® series from Cytec), organosilicones (e.g. Silwet® series from Witco) and fluoro surfactants (e.g. Zonyl® series from DuPont).

The total amount of glycols, glycol ether(s), propylene glycols, monoethylene glycols and/or 1,2-alkanediols, added to the immobilizing composition on the high end is typically in the range of about 10-40% and more typically about 20-50% by weight, and on the low end typically in the range of about 5-15% by weight and more typically about 2-10% by weight, based on the total weight of the composition. Surfactants may be used, typically in the amount of about 0.01-5% and preferably about 0.2-2%, based on the total weight of the composition.

Physical/Mechanical Properties:

The FCRA-containing immobilizing composition presented herein is formulated so as to be suitable for application thereof in-line of an inkjet printing process. In other words, the immobilizing composition is designed to be applied directly on the substrate as part of the printing process rather than a pre-treatment step before the printing process, which can take place off-line of the inkjet printing process. Such formulation incurs some limitations of the immobilizing composition, particularly in the sense that the composition is required to be suitable for inkjet applicators that form a part of the inkjet machinery, and particularly the parts that involve direct inkjet printing.

The mechanical properties of the FCRA-containing immobilizing composition presented herein are correlated, at least to some extent, to the properties of the liquid applicator used to apply the composition on the substrate. Suitable applicators include high-output capacity spray nozzles that are typically used to cover relatively large area of the substrate at relatively low resolution, and inkjet printheads, the latter being more delicate and complex and used for accurate drop placement (high resolution) at relatively low-output capacity. For simplicity, the term "nozzle" is used herein to refer to the high-output low resolution liquid applicator, and the term "printhead" is used to refer to the low-output high resolution liquid applicator. Output capacity may also be affected by the relative speed by which the applicator moves over the substrate (or the substrate moves under the applicator) during the printing process, however the output capacity is determined while taking that relative motion into account by reporting the total amount of liquid that is being delivered to a unit area at a unit time. A typical printhead delivers ink according to the varied digitized color requirements at any given image segment ("pixel"), pallet motion and printhead frequency, while a typical spray nozzle delivers constant amount under constant pressure of liquid over time, varied by pallet motion. For an exemplary comparison, a spray output capacity of a nozzle ranges about 4-5 grams per square inch at a pressure of about 1.5 bar, while the jetting output capacity of a printhead ranges about 0.02-0.05 grams per square inch.

According to some embodiments, when the FCRA-containing immobilizing composition is designed to be applied (sprayed) by a nozzle (referred to herein as a sprayable friction-coefficient reduction composition, or SFCR composition), its ingredients are selected and/or treated such that the composition exhibits (characterized by) at least one of the following attributes:

a maximal particle size of less than 10, 15 or 20 microns;

a dynamic viscosity at shear that ranges from 2 to 4 (N·s)/m2;

a room temperature Brookfield viscosity less than 3 centipoises;

a surface tension that ranges from 24 to 26 N/m; and an electrical resistance of 50 to 2000 ohm per centimeter.

According to some embodiments, when the FCRA-containing immobilizing composition is designed to be applied (jetted) by a printhead (referred to herein as a jetable friction-coefficient reduction composition, or JFCR composition), its ingredients are selected and/or treated such that the composition exhibits (characterized by) at least one of the following attributes:

a maximal particle size of less than 1, 5 or 10 microns;

a dynamic viscosity at shear that ranges from 8 to 20 (N·s)/m2;

a room temperature Brookfield viscosity less than 25 centipoises;

a surface tension that ranges from 24 to 32 N/m; and an electrical resistance of 50 to 2000 ohm per centimeter.

According to some embodiments of the present invention, the FCRA-containing immobilizing composition is a water-based composition, and the immobilizing composition carrier, namely the first carrier, is an aqueous carrier, or water.

Compatible Colored Ink Composition:

The FCRA-containing immobilizing composition presented herein is designed to interact with a compatible colored ink composition, referred to herein in short as "ink composition", namely the liquid inkjet formulation that carries a colorant to the surface of the substrate, thereby forming a printed image or design thereon.

The ink composition, comprises a colorant (typically a dispersed pigment or another solid particulate colorant), a property-sensitive agent, a film-forming agent (binder) and a carrier. The ink composition may further include other ingredients, such as additional resin binders, additional film-forming agents, additional adhesion promoting agents, humectants, surface-active agents, viscosity-modifying agents, and additional dispersing agents.

The term "colorant", as used herein, describes a substance which imparts the desired color to the printed image. The colorant may be a pigment, a dye or any other form of a color-bearing substance. Pigments and other solid particulate colorants are typically suspended in the carrier of the ink composition as dispersed particles, whereas dyes are colorants which are dissolved in the carrier of the ink composition. Some dyes may be insoluble liquids which form emulsions with the carrier. According to embodiments of the present invention, the colorant is a dispersed pigment and other solid particulate colorants.

According to some embodiments, a property-sensitive agent is an alkali-soluble agent in the form of a dispersed agent and/or emulsified agent. In such embodiments, the presence of the acidic immobilizing composition causes the alkali-soluble dispersed agent and/or alkali-soluble emulsified agent to break out of its dispersed and/or emulsified state and cause immobilization of the ink by congelation; the dispersed pigment precipitates and becomes too viscous to flow, thus its substrate penetration and soaking and inter-ink mixing is essentially prevented.

In some embodiments, an alkali-soluble property-sensitive agent is selected for its capacity to coagulate upon contacting an acid or otherwise being in an acidic environment, is at least one of the group consisting of a resin binder, a dispersing agent, an adhesion-promoting agent and a film-forming agent. In some embodiments, the alkali-soluble property-sensitive agent is a dispersing agent, such as used for dispersing pigments. In some embodiments, the alkali-soluble agent is a resin binder, such as used to improve the cohesion of the film. In some embodiments, the alkali-soluble agent is an adhesion-promoting agent, such as used to improve the adhesion of the film to the substrate. In some embodiments, the alkali-soluble agent is a film-forming agent.

In some embodiments, the property-sensitive agent is selected from the group consisting of an alkali-soluble resin, an alkali-soluble polymer, an alkali-soluble dispersant, an alkali-soluble surfactant, an alkali-soluble coagulant and an alkali-soluble gelling agent.

Chemical characterization of the alkali-soluble agent includes a plurality of functional groups that are charged at neutral or alkali conditions, and become neutral in acidic conditions. For example, a carboxylate group (—C(=O)—O$^-$) being negatively charged at neutral or alkali conditions, may become neutral at acidic conditions (—C(=O)—OH), thereby rendering the molecule it is attached to less water soluble. In some embodiments, the alkali-soluble agent is selected from the group consisting of an acrylate polymer, an emulsified polyurethane, a polyurethane polymer, a polyether polymer, a polyester polymer, a polyacrylate polymer, a polyvinyl chloride polymer, a polyvinyl acetate polymer, a polyvinyl butyral polymer, an aminosilicon polymer and any salt or combination thereof.

Any one of the above resin binder, a dispersing agent, an adhesion promoting agent and a film-forming agent, and other optional and/or additional ingredients of the ink composition may also confer stretchability to the resulting image. Such agents are generally referred to herein as proto-elastomeric film-forming agents which imparts elastic stretchability. In some embodiments the proto-elastomeric film-forming agent is also the alkali-soluble agent, and in some embodiments the proto-elastomeric film-forming agent is not the alkali-soluble agent. In general, when proto-elastomeric film-forming agents co-polymerize, cross-link and cure and thereby affix to the substrate, a soft, flexible and stretchable elastic film is formed which is characterized by a relatively low Tg.

According to some embodiments of the present invention, the ink composition is a water-based inkjet ink composition, thus the carrier of the ink composition is an aqueous carrier or water.

The ink compositions contemplated within the scope of the present invention, may carry transparent-translucent or opaque colorants. The basic colorants in inkjet ink compositions are typically required to be transparent-translucent, since only a few (typically 3-8) basic colors are used and the full spectrum of colors and shades is achieved when these basic colors are perceived by the eye as mixed in various combinations on the substrate. However, direct printing of multicolor images using transparent inks on any surface requires the surface, which is the background of the image, to be white or at least lightly-colored, since its inherent color participates in the formation of the final perceived color, together with the colorant in the inks applied thereon. Surfaces of darkly colored or non-white substrates tend to render the primary-colored ink drops indistinguishable or substantially color-skewed since the final perceived color stemming from any combination of the primary colors is a subtraction of that particular combination from the color white, or at least from a bright light color. It is therefore a physical requirement that the background of an image generated directly onto a surface be a bright light color or white.

To overcome the problem of printing on a non-white substrate, an opaque white underbase layer may be printed on the substrate before the translucent colored ink composition is printed. This opaque underbase layer is afforded by an opaque ink composition, according to some embodiments of the present invention. The opaque ink composition, according to some embodiments of the present invention may also contain an alkali-soluble agent, and thus may be designed to congeal upon contacting the FCRA-containing immobilizing composition presented herein.

According to some embodiments, the opaque ink composition is essentially white, affording an opaque white layer when jetted on a darkly-colored or non-white surface. According to some embodiments, the white opaque pigment is suitable-sized particles of a metal oxide, such as, for example, titania (titanium oxide).

According to some embodiments, in order to serve as an underbase for a stretchable and flexible image, the opaque underbase should also be stretchable, with a high elongation factor that enables the image printed thereon to maintain its background when stretched with the substrate, without having the (colored) substrate to be seen therethrough and without having the image or the underbase crack under physical pull and tug.

The opaque ink composition, according to some embodiments of the present invention, is suitable for inkjet printing of "spot" colorants, which are substantially opaque colored inks. Spot colorant can be jetted like any other transparent colorants, and are typically used to generate special effects in order to afford highlights and emphases over the image usually in pre-defined coloration.

In general, any reference to an ink composition made herein, should be taken as referring to any translucent ink composition of any color, and to any opaque ink composition of white or any other spot color, unless stated otherwise.

An Inkjet Printing Kit (Inkset):

According to an aspect of some embodiments of the present invention, there is provided an inkjet printing kit (inkset) that includes at least the FCRA-containing immobilizing composition as described herein, and at least one colored ink composition as defined herein. In some embodiments, each of the immobilizing composition and the colored ink composition are packaged separately in a packaging material, and optionally identified in print, in or on the packaging material, for use in immobilizing said ink composition upon contacting said ink composition and for reducing the friction-coefficient of an inkjet-printed image.

In some embodiments, the inkset presented herein includes an immobilizing composition that comprises an FCRA agent and a first carrier being formulated to exhibit an acidic pH (lower than 6.5), and at least one colored ink composition that comprises a dispersed pigment, an alkali-soluble agent, a film-forming agent (binder) and a second carrier. In some embodiments the first and second carriers are aqueous carries.

In general, the inkset is formulated for use in a digital inkjet printing machine, which digitally applies the various compositions directly on the substrate according to a predetermined pattern that is effected digitally by the printing machine. Preferably, the instantly provided inkset is for digitally printing a color image on a textile substrate. The image is formed as a film that encapsulates and affixes colorants, typically dispersed pigments, to the surface of the substrate.

The composition, inkset and process provided herein are particularly useful, and therefore also may be identified for use in inkjet printing color images on fabric substrates that have not been pre-treated for softness and smoothness prior to the printing process. In other words, the substrate for which the present invention is useful, includes untreated substrates. The term "untreated, as used herein, refers to any dyed substrate that has not been treated for softness and smoothness prior to, and/or off-line of printing process. The inkset provided herein allows printing color images on textile substrates without the need for the substrate to be pre-treated or post-treated for softness and smoothness. Pre-treatment for softness and smoothness known in the art include, without limitation, coating the yarns with specific softening agents, padding/soaking and then drying the surface of the textile to be printed on with softening agents, and/or treating the cured image on the substrate with softening agents.

Printing Process for Dyed Synthetic Fabrics:

In the context of embodiments of the present invention, the FCRA-containing immobilizing composition and the colored ink composition can be applied on the substrate concomitantly or virtually simultaneously. Alternatively, the FCRA-containing immobilizing composition and the colored ink composition can be applied on the substrate following one-another, wet-on-wet without drying or curing between applications, yet with some delay in between (over a short period of time measured in seconds) than may range from 0.01 seconds to 120 seconds, or 0.01-90, 0.01-60, 0.01-45, 0.01-30, 0.01-20, 0.01-10, 0.01-5 or 0.01-1 sec.

The sequence and timing will depend on the needs of the application. For example, on a porous substrate, there might be benefits in applying the FCRA-containing immobilizing composition first, followed by the colored ink composition(s) to limit the latter's penetration into the substrate. This could limit bleed and provide a chroma boost as well as a more durable crosslinked layer. Alternatively, the colored ink composition is jetted first followed by the FCRA-containing immobilizing composition to provide maximum smoothening of the top of the printed layer. If the two compositions are applied concomitantly or virtually simultaneously, then the mixing of the two compositions would be maximized and the whole layer would be more uniform.

Once the image is printed on the substrate, using the inkset according to some embodiments of the present invention, the process further includes curing the image. Curing is typically effected at elevated temperatures so as to remove as much of the carrier from the printed film and/or thereby initiate the crosslinking reaction.

It is noted herein that the printing process described herein requires that the FCRA-containing immobilizing composition and the colored ink composition are each individually applied on the substrate by a separate designated liquid applicator.

Thus, according an aspect of some embodiments of the present invention, there is provided a process for digital inkjet printing color images directly on a dyed substrate using the inkset described herein, the process includes:

Applying an acidic FCRA-containing immobilizing composition described herein from a designated applicator on at least a portion of the substrate using a printhead (an accurate controllable applicator for small amounts for areas of the substrate where the image is printed on) or a spray nozzle (an applicator for large amounts on larger areas requiring lower resolution);

printing at least one colored ink composition as described herein directly on the aforementioned portion of the substrate; and curing the formed image (a film) on the surface of the substrate.

It is expected that during the life of a patent maturing from this application many relevant processes, machines and compositions for lowering friction coefficient of inkjet-printed images will be developed and the scope of these terms are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the phrases "substantially devoid of" and/or "essentially devoid of" in the context of a certain substance, refer to a composition that is totally devoid of this substance or includes less than about 5, 1, 0.5 or 0.1 percent of the substance by total weight or volume of the composition. Alternatively, the phrases "substantially devoid of" and/or "essentially devoid of" in the context of a process, a method, a property or a characteristic, refer to a process, a composition, a structure or an article that is totally devoid of a certain process/method step, or a certain property or a certain characteristic, or a process/method wherein the certain process/method step is effected at less than about 5, 1, 0.5 or 0.1 percent compared to a given standard process/ method, or property or a characteristic characterized by less than about 5, 1, 0.5 or 0.1 percent of the property or characteristic, compared to a given standard.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The words "optionally" or "alternatively" are used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Example 1

Materials and Methods

Sliding Friction Coefficient Testing:

All static and dynamic friction coefficient measurements, testing the effect of the compositions and processes presented herein, were performed using a TG112-LS material testing machine, equipped with a TG19 or TG35 friction coefficient testing jig for 100 N maximal force, manufactured by Lloyd™ Instruments of AMETEK® Test & Calibration Instruments, USA.

The device was operated using a sled probe (5 cm$^2$ area), weighing 200 gram-force, moved at a speed of 150 mm/minute for 130 mm travel length. The test was run according to the specification, as known in the industry.

Printing Machine:

All printing tests were performed on an Allegro® printing machine by Kornit Digital™ LTD, using Dimatex, Polaris PWR, 35 picoliter drop size printheads. In the experiments where the FCRA was included and applied with the immobilizing composition using a printhead, the printing machine was equipped with a standard drop-on-demand recirculation printhead for applying the immobilizing composition. In the experiments where the FCRA was included and applied with the immobilizing composition using a pre-printing nozzle prior to printing the colored ink compositions, the printing machine was equipped with a linear array assembly of nozzles essentially as described hereinabove. In the experiments where the FCRA was applied over the freshly printed and immobilized image, the printing machine was equipped with essentially the same array assembly of nozzles as described hereinabove. The fabrics used were white cotton fabrics.

JFCR Formulations:

The jetable formulation is formulated to be highly chemically stable and compatible with printheads. JFCR formulations do not contain ammonium lactate as it incompatible with the FCRA. Typically the JFCR formulations contain a static and dynamic surface active agent for surface tension reduction, which is stable in an acidic environment.

Table 1 presents an exemplary formulation for ink immobilization and reduction of friction coefficient, formulated for applying by a general purpose digital jet printing printhead:

TABLE 1

| Ingredient | Function | Amount |
| --- | --- | --- |
| Amino-modified polysiloxane emulsion (ASR 20 micro by AVCO Israel) | FCRA | 5%, 10%, 15%, 20%, 25%, 30% and 35% |
| Propylene glycol (PG) | Humectant | 36.00% |

TABLE 1-continued

| Ingredient | Function | Amount |
|---|---|---|
| Monoethylene glycol (MEG) | Humectant | 15.60% |
| Benzotriazole | Anticorrosion agent | 0.30% |
| Lactic acid (stock 88%) | Unbuffered property-adjusting agent (transitory acid) | 6.00% |
| Dynol ™ 360 | Surfactant | 0.50% |
| DIW (to QS) | Carrier | 16.6% |
| Total |  | 100% |
| Viscosity (cP) |  | 7-9 |
| pH |  | 4 |

Table 2 presents an exemplary formulation for pre-printing ink immobilization and reduction of friction coefficient, formulated for applying by a nozzle prior to printing the colored ink compositions, as well as pre-curing and after printing the inks,

TABLE 2

| Ingredient | Function | Amount |
|---|---|---|
| Amino-modified polysiloxane emulsion (ASR 20 micro by AVCO Israel) | FCRA | 5%, 10%, 15%, 20%, 25%, 30% and 35% |
| Acetic acid | Property-adjusting agent (transitory acid) | 1.5% |
| Dynol ™ 360 | Surfactant | 0.50% |
| DIW (to QS) | Carrier | 93% |
| Total |  | 100% |
| Viscosity (cP) |  | 3-4 |
| pH |  | 4 |
| Surface tension (dyne/cm$^2$) |  | 30 |

For comparing the effect of incorporating FCRA, the same printing process and testing was performed on images formed using an immobilization composition without a FCRA as control, and an exemplary control composit9oon is presented in Table 3.

TABLE 3

| Ingredient | Function | Amount |
|---|---|---|
| FCRA | FCRA | 0.00% |
| Propylene glycol (PG) | Humectant | 59% |
| Monoethylene glycol (MEG) | humectant | 16% |
| Benzotriazole | Anticorrosion agent | 0.30% |
| Lactic acid (stock 88%) | Property-adjusting agent (transitory acid) | 6.00% |
| Ammonium lactate | Buffering agent | 3% |
| Dynol ™ 360 | Surfactant | 0.50% |
| DIW (to QS) | Carrier | 16.6% |
| Total |  | 100% |
| Viscosity (cP) |  | 7-9 |
| pH |  | 4 |

Table 4 presents the ingredients of an exemplary colored ink composition, used in this example.

TABLE 4

| Ingredient | Function | Amount |
|---|---|---|
| Pigment dispersion (20%) | Cyan, Magenta, Yellow or Black pigment colorant dispersion | 5-10% |
| Propylene glycol (PG) | Humectant | 10-40% |
| Glycerin | Humectant | 1-10% |
| Triethylamine | pH setting agent | 0.4% |

TABLE 4-continued

| Ingredient | Function | Amount |
|---|---|---|
| Acrylic emulsion (50% stock) | Alkali-soluble property-sensitive agent | 6.00% |
| MBS | Biocide | 0.50% |
| DIW | Carrier | To QS |
| Total |  | 100% |
| Surface Tension |  | 33 |
| Viscosity (cP) |  | 14.5-12.4 |
| pH |  | 8.4 |

The experiment was conducted by printing a rectangular shape on a white substrate (white cotton fabric) using a colored ink composition preceded by printing on or spraying the substrate with a JFCL or SFCL formulation in a series of increasing concentrations of the FCRA at 5% steps, covering a white background and tested (analyzed) for friction coefficient and yellowing (color augmentation). In the case of a JFCR formulation, the tests were conducted on the colored printed shape since no FCRA is applied elsewhere, and in the case of a SFCR formulation the testing was conducted on the background (outside the printed shape) and on the printed shape (two points of testing for friction and yellowing/color augmentation).

Example 2

Results

A white cotton fabric was placed in the printing machine and rectangular shaped image was printed thereon using various pigment colored ink compositions.

Table 5 and Table 6 present the results of the experiment described in Example 1 hereinabove, wherein Table 1 presents the results obtained for the SFCL formulation, applied on an area larger than the printed image, and therefore affecting the background (substrate) smoothness and color, and Table 6 presents the results obtained for the JFCL formulation, applied only on the area of the printed image.

Fabric ΔE (vs. reference) is the difference in the colorimetric Lab parameters between the unprinted fabrics areas that were stained with JFCR or SFCR formulations;

Film ΔE is the difference in the colorimetric Lab parameters between the printed fabrics areas that were stained with JFCR or SFCR formulations;

Fabric static COF is the static coefficient of friction measured on unprinted fabric using the TG-112 jig by Lloyd™ Instruments;

Film static COF is the static coefficient of friction measured on the surface of printed fabric using the same jig TG-112;

Fabric dynamic COF is the dynamic coefficient of friction measured on the surface of unprinted fabric using the same jig TG-112;

Film dynamic COF is the dynamic coefficient of friction measured on the surface of printed fabric using the same jig TG-112.

TABLE 5

| Percent FCRA | 5% | 10% | 15% | 20% | 25% | 30% | 35% |
|---|---|---|---|---|---|---|---|
| Fabric ΔE (vs. reference) | 1 | 1.3 | 1.5 | 1.8 | 3.9 | 4.2 | 5.2 |
| Film ΔE | 0.5 | 0.5 | 0.5 | 0.5 | 0.5 | 0.7 | 0.9 |
| Fabric static COF | 1.200 | 1.084 | 1.144 | 1.034 | 1.050 | 0.984 | 0.931 |
| Film static COF | 0.742 | 0.701 | 0.498 | 0.490 | 0.489 | 0.505 | 0.504 |
| Fabric dynamic COF | 0.781 | 0.729 | 0.748 | 0.710 | 0.735 | 0.636 | 0.757 |
| Film dynamic COF | 0.469 | 0.455 | 0.439 | 0.435 | 0.430 | 0.445 | 0.471 |

TABLE 6

| Percent FCRA | 5% | 10% | 15% | 20% | 25% | 30% | 35% |
|---|---|---|---|---|---|---|---|
| Film ΔE | 0.5 | 0.5 | 0.5 | 0.5 | 0.5 | 0.7 | 0.9 |
| Film static COF | 0.742 | 0.701 | 0.498 | 0.489 | 0.489 | 0.505 | 0.504 |
| Film dynamic COF | 0.469 | 0.455 | 0.439 | 0.657 | 0.430 | 0.445 | 0.471 |

As can be seen in Table 5 and Table 6, the amount of the FCRA correlates to the level of friction-coefficient reduction (smoothening) of the substrate/printed image, as well as to the color augmentation (yellowing) of the substrate's background color as well as that of the printed image. It can be seen that while the friction-coefficient is reduced as the concentration of the FCRA increases, there is an increased level of discoloration, leading to the conclusion that there is an optimal balance between smoothness and discoloration from about 20% to about 30% of FCRA in both the SFCL and JFCL formulations.

Although the invention has been described in conjunction with specific embodiments thereof, it is evident that many alternatives, modifications and variations will be apparent to those skilled in the art. Accordingly, it is intended to embrace all such alternatives, modifications and variations that fall within the broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. An inkjet ink immobilizing composition, comprising a property-adjusting agent, a friction-coefficient reduction agent and a carrier, wherein said property-adjusting agent is an acid that lowers a pH level at a surface of a substrate thereby effecting immobilization of an ink composition upon contacting said ink composition with the immobilizing composition on said surface, and wherein a said friction-coefficient reduction agent is stable under acidic conditions and soluble in the immobilizing composition at a concentration of at least 15% of the total weight of the composition.

2. The immobilizing composition of claim 1, wherein said concentration of said friction-coefficient reduction agent in the immobilizing composition ranges from 15% to 35% of the total weight of the composition.

3. The immobilizing composition of claim 1, wherein said concentration of said friction-coefficient reduction agent in the immobilizing composition is 25% of the total weight of the composition.

4. The immobilizing composition of claim 1, wherein said friction-coefficient reduction agent is selected from the group consisting of a cationic polysiloxane resin dispersion/emulsion, a cationic amino-functional polysiloxane resin dispersion/emulsion, a cationic quaternary ammonium fatty acid condensation product dispersion/emulsion, and any combination thereof.

5. The immobilizing composition of claim 1, having a pH that ranges from 2 to 6.5.

6. The immobilizing composition of claim 5, wherein a concentration of said acid in the immobilizing composition ranges from 0.5% to 10% of the total weight of the composition.

7. The immobilizing composition of claim 1, substantially devoid of a colorant.

8. The immobilizing composition of claim 1, being for direct inkjet printing application from a nozzle is characterized by at least one of:
 a maximal particle size of less than 15 microns;
 a dynamic viscosity at shear that ranges from 2 to 4 $(N \cdot s)/m^2$;
 a room temperature Brookfield viscosity less than 3 centipoises;
 a surface tension that ranges from 24 to 26 N/m; and
 an electrical resistance of 50 to 2000 ohm per centimeter.

9. The immobilizing composition of claim 1, being for direct inkjet printing application from a printhead is characterized by at least one of:
 a maximal particle size of less than 1 micron;
 a dynamic viscosity at shear that ranges from 8 to 20 $(N \cdot s)/m^2$;
 a room temperature Brookfield viscosity less than 25 centipoises;
 a surface tension that ranges from 24 to 32 N/m; and
 an electrical resistance of 50 to 2000 ohm per centimeter.

10. An image printed on a substrate, wherein the image is in the form of a film attached to the substrate, said film is formed by contacting the immobilizing composition of claim 1 with an ink composition on a surface of the substrate, and curing said film, thereby forming the image.

11. The image of claim 10, wherein said ink composition comprises a dispersed pigment, an acid-sensitive agent and a carrier, said acid-sensitive agent effects coagulation of said ink composition upon contacting said immobilizing composition.

12. The image of claim 10, wherein said acid-sensitive agent is selected from the group consisting of a resin binder, a dispersing agent, a heat curable self-crosslinking resin, an adhesion promoting agent and a film-forming agent.

13. The image of claim 12, wherein said acid-sensitive agent is an emulsified or dispersed alkali-soluble polymer selected from the group consisting of a polyacrylate, a polyurethane, a polyether, a polyester, a polyvinyl chloride, a polyvinyl acetate, a polyvinyl butyral, an aminosilicon and any co-polymer, salt or combination thereof.

14. The image of claim 10, wherein a static friction coefficient of said film is lower than 0.5.

15. The image of claim 10, wherein a dynamic friction coefficient of said film is lower than 0.44.

16. A substrate having the image of claim 10 attached to a surface thereof.

17. The substrate of claim 16, being a textile piece selected from the group consisting of a garment, an upholstery fabric and bedclothes.

18. An inkjet printing kit comprising the immobilizing composition of claim 1 and an ink composition, wherein said ink composition comprises a dispersed pigment, an acid-sensitive agent and a carrier, said acid-sensitive agent effects coagulation of said ink composition upon contacting said immobilizing composition.

19. A process of printing an image on a substrate, comprising contacting at least a portion of the substrate with the immobilizing composition of claim 1, and applying an ink composition on said portion of the substrate, thereby printing the image, wherein said ink composition comprises a dispersed pigment, an acid-sensitive agent and a carrier, said acid-sensitive agent effects coagulation of said ink composition upon contacting said immobilizing composition.

20. The process of claim 19, wherein said immobilizing composition and said ink composition are each individually applied on said portion of the substrate by a separate applicator.

21. The process of claim 20, wherein said immobilizing composition is applied on said surface before said ink composition is applied on said substrate, and said ink composition is applied on said substrate while said substrate is still wet with said immobilizing composition.

22. The process of claim 20, wherein said ink composition is applied on said surface before said immobilizing composition is applied on said substrate, and said immobilizing composition is applied on said substrate while said substrate is still wet with said ink composition.

23. The process of claim 19, further comprising curing the image subsequent to said applying said ink composition.

\* \* \* \* \*

UNITED STATES PATENT AND TRADEMARK OFFICE
CERTIFICATE OF CORRECTION

| | |
|---|---|
| PATENT NO. | : 11,629,265 B2 |
| APPLICATION NO. | : 16/758063 |
| DATED | : April 18, 2023 |
| INVENTOR(S) | : Jacob Mozel et al. |

It is certified that error appears in the above-identified patent and that said Letters Patent is hereby corrected as shown below:

On the Title Page

Item (71) Applicants, Line 2:
Delete the following: "Allon Shimoni"

Item (73) Assignee:
"Rosh HaAyat" should be changed to --Rosh HaAyin--

Signed and Sealed this
Twenty-ninth Day of August, 2023

*Katherine Kelly Vidal*

Katherine Kelly Vidal
*Director of the United States Patent and Trademark Office*